(12) United States Patent
Gijrath

(10) Patent No.: US 11,130,453 B2
(45) Date of Patent: Sep. 28, 2021

(54) SOUND MANAGEMENT SYSTEM FOR A VEHICLE

(71) Applicant: Tenneco Automotive Operating Company Inc., Lake Forest, IL (US)

(72) Inventor: Hans Gijrath, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 298 days.

(21) Appl. No.: 16/274,556

(22) Filed: Feb. 13, 2019

(65) Prior Publication Data

US 2020/0254943 A1    Aug. 13, 2020

(51) Int. Cl.
| | | |
|---|---|---|
| *B60R 13/08* | (2006.01) | |
| *B60J 1/20* | (2006.01) | |
| *H04R 5/02* | (2006.01) | |
| *H04R 5/027* | (2006.01) | |

(52) U.S. Cl.
CPC ............. *B60R 13/0815* (2013.01); *B60J 1/20* (2013.01); *H04R 5/02* (2013.01); *H04R 5/027* (2013.01); *H04R 2499/13* (2013.01)

(58) Field of Classification Search
CPC .......... B60R 13/0815; B60J 1/20; H04R 5/02; H04R 5/027; H04R 2499/13; G10K 11/16; G10K 11/178; G10K 2210/128; G10K 2210/1282

USPC ..... 381/71.1, 71.13, 71.14, 71.2, 71.4, 71.8, 381/86, 91, 124

See application file for complete search history.

(56) References Cited

U.S. PATENT DOCUMENTS

| | | | |
|---|---|---|---|
| 8,148,881 B2 | 4/2012 | Yoneyama | |
| 9,102,123 B2 | 8/2015 | Torr | |
| 2005/0011277 A1* | 1/2005 | Gao | G01G 3/13 73/826 |
| 2010/0194243 A1* | 8/2010 | Yoneyama | F16L 55/0333 310/338 |
| 2015/0358729 A1* | 12/2015 | Xu | G10K 11/17873 381/71.2 |
| 2018/0190258 A1* | 7/2018 | Mohammad | G10K 11/17883 |

FOREIGN PATENT DOCUMENTS

| | | |
|---|---|---|
| CN | 107323036 | 11/2017 |
| CN | 207620659 | 7/2018 |
| JP | 2007041110 | 2/2007 |

* cited by examiner

*Primary Examiner* — William A Jerez Lora
(74) *Attorney, Agent, or Firm* — McGarry Bair PC

(57) ABSTRACT

A sound management system for a vehicle is provided. The sound management system includes a vehicle window coupled to a vehicle body. The vehicle body defines an interior space of the vehicle. The sound management system also includes a laminate disposed on the vehicle window. The laminate is configured to reduce noise in the interior space of the vehicle.

18 Claims, 5 Drawing Sheets

SOUND MANAGEMENT SYSTEM FOR A VEHICLE

TECHNICAL FIELD

The present disclosure relates to a sound management system for a vehicle. More particularly, the present disclosure relates to the sound management system for controlling noise within the vehicle.

BACKGROUND

In modern passenger vehicles, passenger comfort has become an important selling factor. One important feature in the passenger vehicle is the ability to minimize noise that originates from outside of a cabin of the passenger vehicle. The passenger vehicles are particularly targeted for improving an acoustic quality of the cabin. Noises coming from the engine compartment, from rolling of tires on a road, and wind noise created as the passenger vehicle moves through air are all contributors to noise generation.

One major source of noise, however, is sound and vibrations (from different sources) that passes through windows of the passenger vehicle. The windows are good transmitters of vibrations and sound waves, especially at critical frequencies. It would be desirable to have a glass laminate for the window, which has the benefits associated with standard safety glass and also has the benefit of damping outside sounds. Hence, there is a need for an improved sound management system for such passenger vehicles.

An exemplary U.S. Patent describes a vibration reduction system. The vibration reduction system includes a vibration reduction film and a control unit. The vibration reduction film includes a vibration sensor film, an insulating layer, and a vibration actuator film. In each of the vibration sensor film and the vibration actuator film, two pairs of electrodes are formed on both surfaces of a piezoelectric polymer film into a pattern based on a particular mode of vibration. The electrodes of the vibration sensor film overlap with the electrodes of the vibration actuator film. In response to electric charge signals from the electrodes of the vibration sensor film, the particular mode of vibration is detected. By application of voltages into the electrodes of the vibration actuator film, a vibration of opposite phase is generated to counteract the detected vibration.

Given description covers one or more above mentioned problems and discloses a method and a system to solve the problems.

SUMMARY

In an aspect of the present disclosure, a sound management system for a vehicle is provided. The sound management system includes a vehicle window coupled to a vehicle body. The vehicle body defines an interior space of the vehicle. The sound management system also includes a laminate disposed on the vehicle window. The laminate is configured to reduce noise in the interior space of the vehicle.

In another aspect of the present disclosure, a vehicle is provided. The vehicle includes a vehicle body defining an interior space of the vehicle. The vehicle also includes a sound management system for the vehicle. The sound management system includes a vehicle window coupled to the vehicle body. The sound management system also includes a laminate disposed on the vehicle window. The laminate is configured to reduce noise in the interior space of the vehicle.

In yet another aspect of the present disclosure, a method for controlling noise in an interior space of a vehicle is provided. The method includes receiving, by a controller, a signal indicative of a noise level and frequency inside the vehicle from a sound sensor. The method also includes actuating, by the controller, a sound actuator to control generation of vibrations and transmission of sound into the interior space of the vehicle.

Other features and aspects of this disclosure will be apparent from the following description and the accompanying drawings.

DETAILED DESCRIPTION

Figure 1:
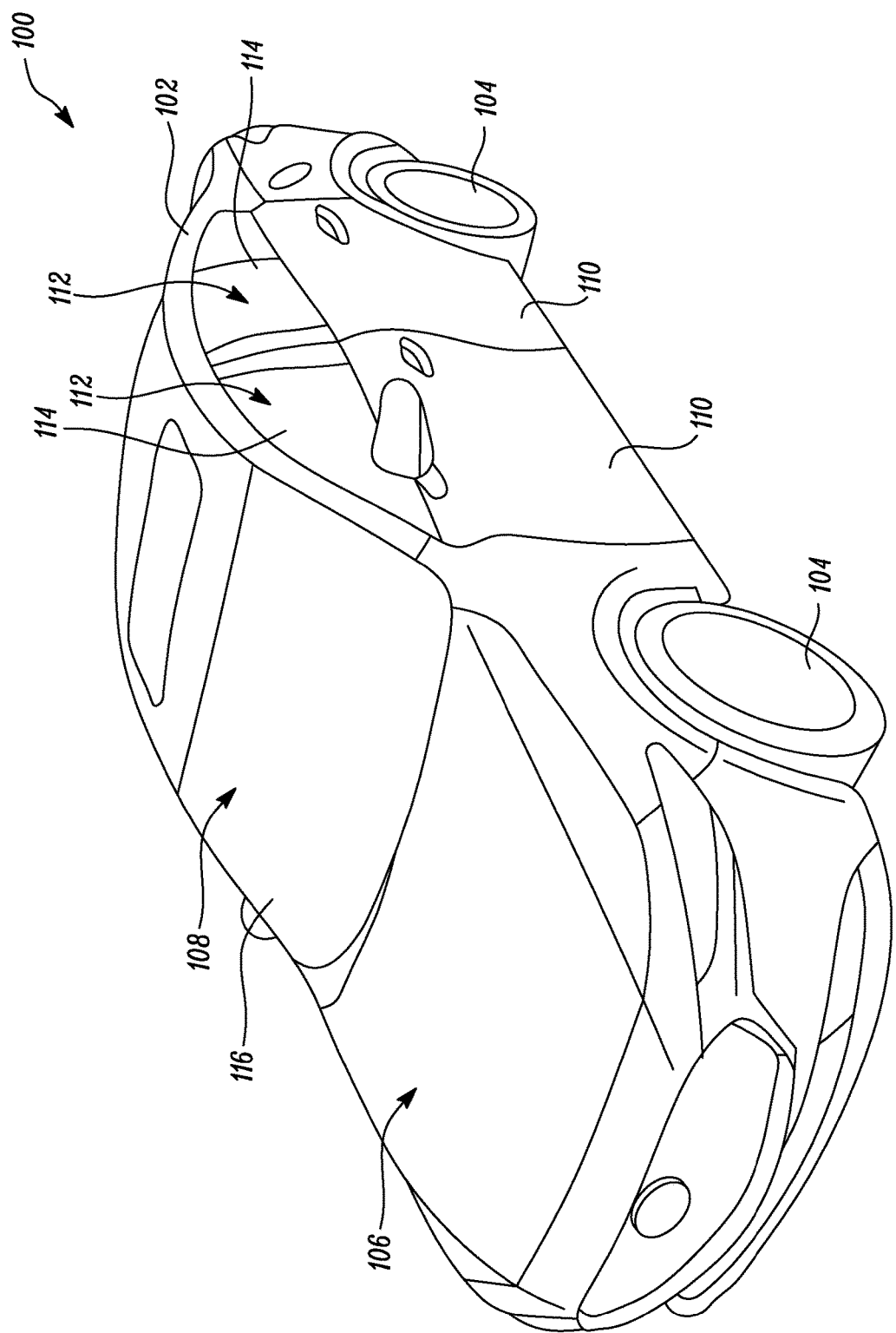
FIG. 1 is a perspective view of an exemplary vehicle, according to an aspect of the present disclosure.

Wherever possible, the same reference numbers will be used throughout the drawings to refer to same or like parts. Referring to FIG. 1, a perspective view of an exemplary vehicle 100 is illustrated. In the illustrated embodiment, the vehicle 100 is a sedan type passenger car. In other embodiments, the vehicle 100 may be any other vehicle, such as a hatchback car, a Sports Utility Vehicle (SUV), a Multi Utility Vehicle (MUV), a bus, a truck, a van, a train, an aircraft, a ship, and the like.

The vehicle 100 includes a chassis 102. The chassis 102 is adapted to support one or more components and systems of the vehicle 100. The vehicle 100 includes number of wheels 104 rotatably mounted to the chassis 102. Each of the wheels 104 is adapted to support and provide mobility to the vehicle 100 on ground. The vehicle 100 includes a body 106 mounted on the chassis 102. The body 106 is adapted to enclose one or more components and systems (not shown) of the vehicle 100, such as an engine system, a transmission system, an air intake system, an exhaust aftertreatment system, a Heating, Ventilation, and Air Conditioning (HVAC) system, a lubrication system, a steering system, a drive control system, an occupant safety system, and the like.

The vehicle 100 also includes an interior space, such as a cabin 108, provided within the body 106. The cabin 108 is adapted to enclose number of utilities (not shown), such as seats, one or more elements of the steering control system and the drive control system, an In-Car Entertainment (ICE) system, the occupant safety system, the HVAC system, and the like. The cabin 108 may be accessed via number of doors 110 and windows 112 provided on the body 106. During usage of the vehicle 100, one or more occupants present in the cabin 108 may experience noise within the cabin 108.

The noise may comprise one or more of an engine noise, an exhaust noise, a wind noise, a tire noise, a suspension noise, an external noise such as honking, sounds from other vehicles, and the like. In situations when the windows 112 may be shut or rolled up using panes 114, the noise may be transmitted into the cabin 108 via the panes 114 or a windshield 116, which may be typically made of polymer-based glass. Any other suitable material may also be used which is applicable with various aspects of the present disclosure.

Figure 2:
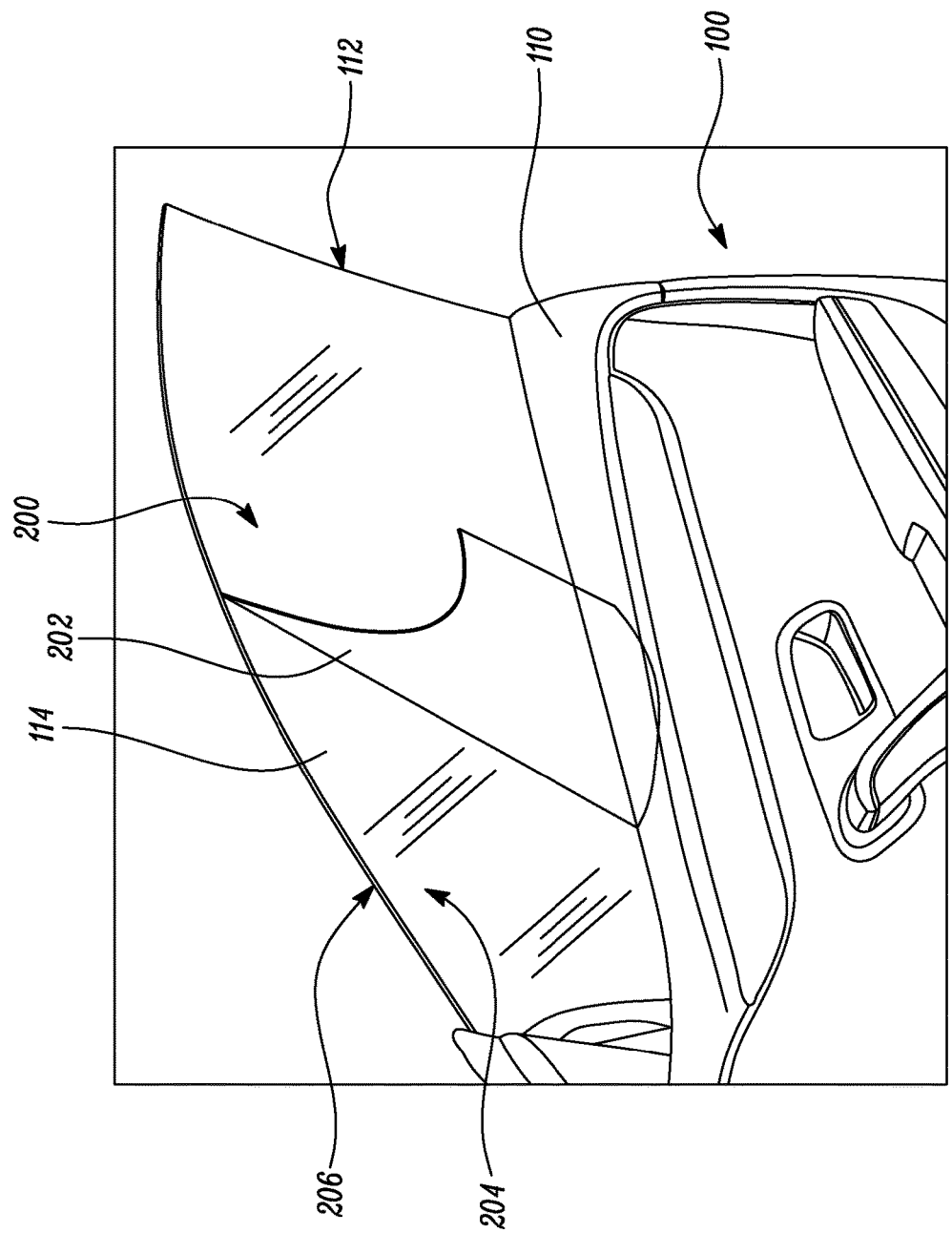
FIG. 2 is a perspective view of an exemplary laminate partially disposed on a pane of a window of the vehicle of FIG. 1, according to an aspect of the present disclosure.

The present disclosure relates to a sound management system 200 for the vehicle 100. Referring to FIG. 2, a perspective view of one embodiment of the sound management system 200 is illustrated. The sound management system 200 will be hereinafter interchangeably referred to as the "system 200". In the illustrated embodiment, the system 200 includes a laminate 202 disposed on the pane 114 of the window 112 of the vehicle 100. More specifically, in the illustrated embodiment, the laminate 202 is disposed on an inner surface 204 of the pane 114. In other embodiments, the laminate 202 may be alternatively disposed on an outer surface 206 of the pane 114. In yet other embodiments, the laminate 202 may be disposed on each of the inner surface 204 and the outer surface 206 of the pane 114 and/or the windshield 116. The laminate 202 is configured to reduce noise in the interior space of the vehicle 100.

Figure 3:
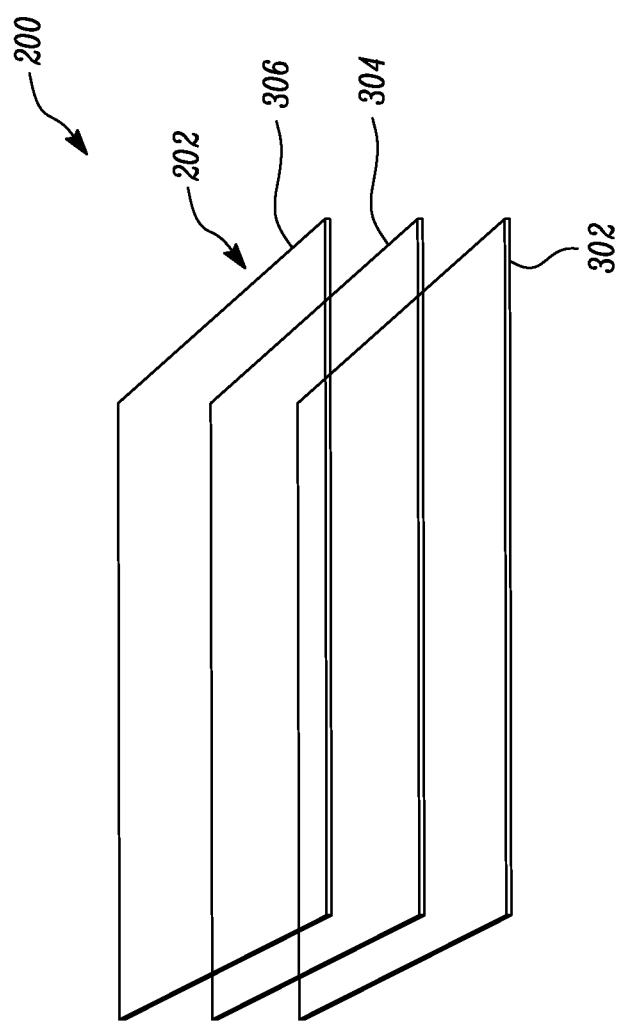
FIG. 3 is an exploded perspective view of the exemplary laminate of FIG. 2, according to an aspect of the present disclosure.

More specifically, in the illustrated embodiment, the laminate 202 is a passive film adapted to reduce transmission of external sound to the interior of the vehicle 100. Referring to FIG. 3, an exploded view of the laminate 202 is illustrated. In the illustrated embodiment, the laminate 202 includes a ply type construction having number of layers, such as a base layer 302, an intermediate layer 304, and a cover layer 306. Each of the base layer 302, the intermediate layer 304, and the cover layer 306 may be bonded to one another using any method, such as application of an adhesive and/or pressure, heat treatment, and the like.

The base layer 302 is adapted to be affixed to the pane 114, such as through application of an adhesive (not shown). Accordingly, the base layer 302 is adapted to apply the laminate 202 to the pane 114 of the window 112. The intermediate layer 304 is adapted to attenuate the sound being transmitted by the pane 114 of the window 112. In one embodiment, the intermediate layer 304 may be made of a sound absorbing material in order to absorb sound waves incident on the laminate 202. In another embodiment, the intermediate layer 304 may be made of a sound reflecting material in order to reflect sound waves incident on the laminate 202. The cover layer 306 is adapted to provide bonding and/or surface protection to the intermediate layer 304. In some embodiments, the base layer 302 and/or the cover layer 306 may also include sound absorbing or sound reflecting properties, as the case may be, in order to provide additional sound attenuation in association with the intermediate layer 304.

It should be noted that construction of the laminate 202 described herein is merely exemplary and may vary based on application requirements. For example, in some embodiments, the laminate 202 may include two layers, such as the base layer 302 and the intermediate layer 304. In such a situation, the cover layer 306 may be omitted, such that function and/or properties of the cover layer 306 may be integrated into the intermediate layer 304. In some embodiments, the laminate 202 may include a single layer corresponding to the intermediate layer 304. In such a situation, each of the base layer 302 and the cover layer 306 may be omitted, such that function and/or properties of each of the base layer 302 and the cover layer 306 may be integrated into the intermediate layer 304. Further, in some embodiments, the laminate 202 may include multiple layers of one or more of the base layer 302, the intermediate layer 304, and/or the cover layer 306 based on a required level of sound attenuation.

Figure 4:
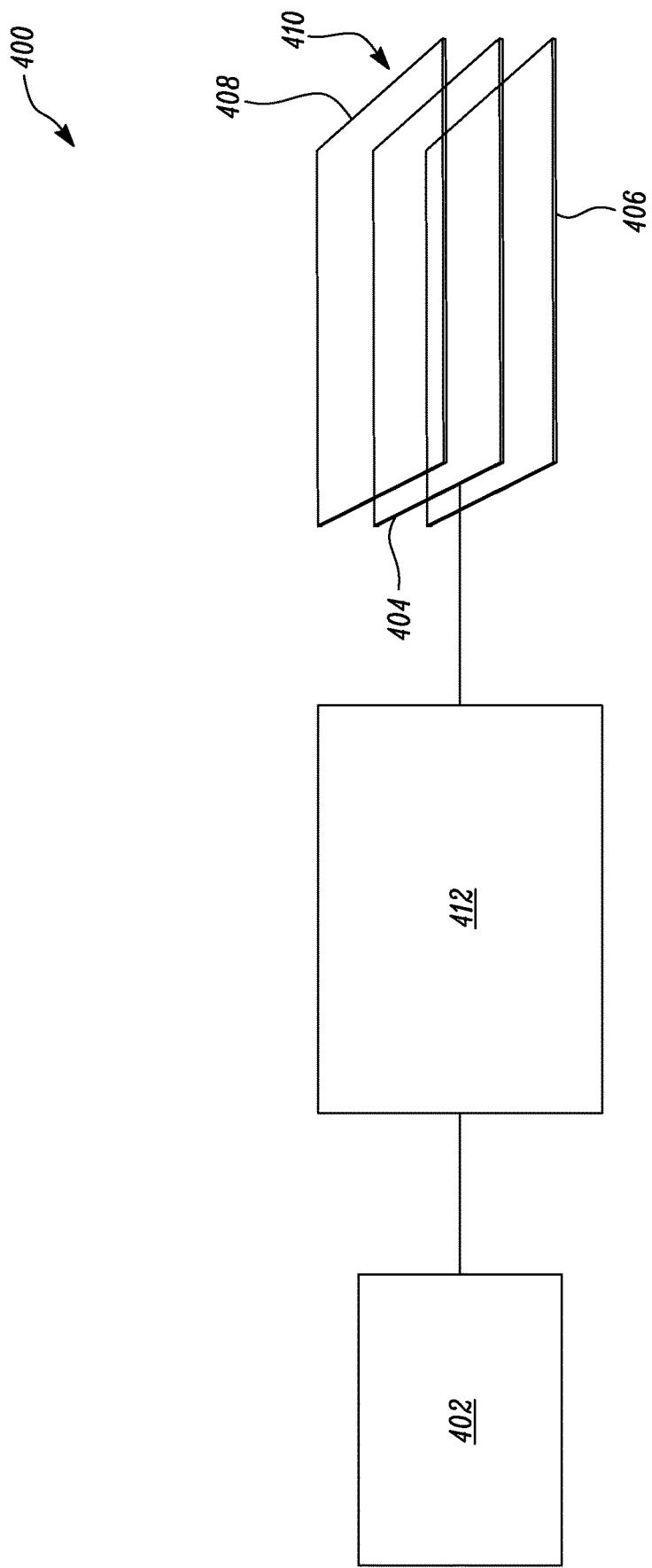
FIG. 4 is an exemplary schematic representation of a sound management system for the vehicle of FIG. 1, according to an aspect of the present disclosure.

Referring to FIG. 4, a schematic representation of another embodiment of the system 400 is illustrated. In the illustrated embodiment, the system 400 includes a sound sensor 402. The sound sensor 402 may be disposed inside the cabin 108 of the vehicle 100. The sound sensor 402 is configured to generate a signal indicative of a noise level inside the vehicle 100. In one embodiment, the sound sensor 402 may be a microphone configured to generate a signal indicative of the noise level inside the cabin 108 of the vehicle 100. In another embodiment, the sound sensor 402 may be a vibration sensor configured to generate a signal indicative of a vibration level inside the cabin 108 of the vehicle 100. In such a situation, the vibration level may correspond to the noise level inside the cabin 108 of the vehicle 100. In yet another embodiment, the sound sensor 402 may be a combination of the microphone and the vibration sensor.

The system 400 also includes a sound actuator 404. The sound actuator 404 is adapted to be disposed on the pane 114 of the window 112 of the vehicle 100. The sound actuator 404 may be any sound generating device, such as a vibratory actuator, a micro speaker, a nano speaker, a sound transducer, and the like. The sound actuator 404 is configured to generate vibrations and transmit sound to reduce noise in the cabin 108 of the vehicle 100. In the illustrated embodiment, the sound actuator 404 is disposed between a base layer 406 and a cover layer 408 of a laminate 410. Further, the base layer 406 and the cover layer 408 may be bonded to one another with the sound actuator 404 sandwiched therebetween in order to form the laminate 410. Accordingly, the laminate 410 is an actively controlled film configured to generate the vibrations and transmit sound to reduce noise in the interior space of the vehicle 100.

It should be noted that construction of the laminate 410 described herein is merely exemplary and may vary based on application requirements. In other embodiments, the sound actuator 404 may be disposed on the base layer 406. In such a situation, the cover layer 408 may be omitted. In some embodiments, the sound actuator 404 may be directly disposed on the pane 114 of the window 112 of the vehicle 100. In yet other embodiments, the sound actuator 404 may be disposed on the laminate 202 (as described in FIGS. 2 and 3). In such a situation, the sound actuator 404 may be disposed on any of the base layer 302, the intermediate layer 304, and/or the cover layer 306 of the laminate 202.

The system 400 further includes a controller 412. The controller 412 may be any control unit known in the art configured to perform various functions of the system 400. In one embodiment, the controller 412 may be a dedicated control unit configured to perform functions related to the system 400. In another embodiment, the controller 412 may be an electronic control unit associated with the vehicle 100, an engine control unit associated with the engine system, a control unit associated with an exhaust active noise cancellation system (not shown), and the like, configured to perform functions related to the system 400.

The controller 412 is communicably coupled to each of the sound sensor 402 and the sound actuator 404. Accordingly, the controller 412 is configured to receive the signal indicative of the noise level inside the cabin 108 of the vehicle 100 from the sound sensor 402. Based on the received signal, the controller 412 is configured to control the laminate 410. In the illustrated embodiment, the controller 412 is configured to control the sound actuator 404 in order to generate the vibrations and transmit sound through the sound actuator 404 and, thus, the laminate 410.

More specifically, the controller 412 is configured to control the sound actuator 404 in a manner to generate the vibrations having a magnitude that is related to a magnitude of the noise/vibrations detected by the sound sensor 402. Also, the controller 412 is configured to control the sound actuator 404 in a manner to generate the vibrations with a certain phase shift with respect to the noise/vibrations detected by the sound sensor 402. Accordingly, the vibrations generated by the sound actuator 404 and, thus, the laminate 410 cancel out the noise/vibrations transmitted into the cabin 108 through the panes 114 of the window 112 of the vehicle 100. As such, the controller 412 is configured to control generation of the vibrations and transmission of sound by the laminate 410.

In an embodiment, The controller 412 processes the received signal. The controller 412 may process the received signal and detect a desirable noise signal and an undesirable noise signal based on the received signal. The desirable noise signal may refer to sounds such as music, speech etc. Further, the undesirable noise signal may refer to sounds such as wind, traffic noise, engine exhaust etc. The controller 412 may transmit the undesired noise signal to the cabin 108 after filtering.

The laminate 410 is configured to be controlled to perform two functions related to sound/vibration. The laminate 410 conducts exterior airborne noise (traffic noise, wind noise etc.), acts as a filter and transmits sound to the cabin 108. The laminate 410 receives structure borne noise arriving via the body 106, engine system, or any other such mechanical sources and transmits this as airborne noise in the cabin 108.

Figure 5:
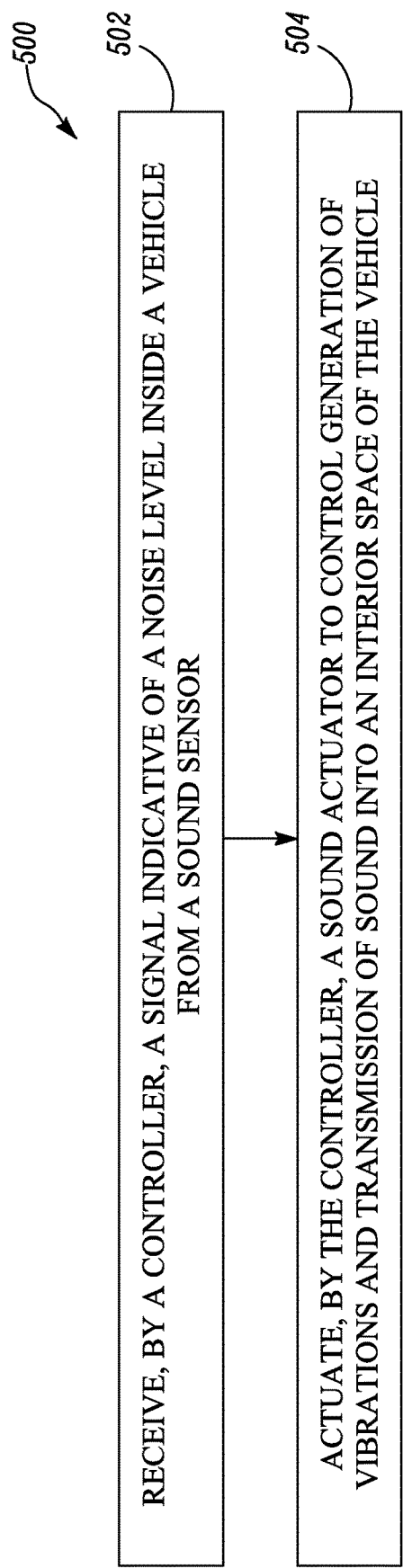
FIG. 5 is a flowchart of a method for controlling noise in an interior space of a vehicle, according to an aspect of the present disclosure.

The present disclosure also relates to a method 500 for controlling noise in the interior space of the vehicle 100. More specifically, referring to FIG. 5, a flowchart of the method 500 of working of the system 400 is illustrated. At step 502, the controller 412 receives the signal indicative of the noise level inside the vehicle 100 from the sound sensor 402. The sound sensor 402 may be any sound sensor, such as the microphone, the vibration sensor, and the like. At step 504, the controller 412 actuates the sound actuator 404 to control generation of vibrations and transmission of sound into the interior space of the vehicle 100. The sound actuator 404 may be any sound generating device, such as a vibratory actuator, a micro speaker, a nano speaker, a sound transducer, and the like. The sound actuator 404 may be disposed directly on the pane 114 and/or on the windshield 116 of the vehicle 100 or in the form of the laminate 410.

The system 200, 400 provides a simple and effective noise reduction system in order to control noise levels within the cabin 108. As such, the system 200, 400 provides an improved acoustic quality with a quiet and comfortable ambience for the occupants within the cabin 108 of the vehicle 100, in turn, improving comfort of the occupants. The laminate 202, 410 includes the ply type construction and is adapted to be disposed on surfaces of the cabin 108, such as the panes 114 of the windows 112 and/or the windshield 116. As such, the system 200, 400 provides a limited footprint within the cabin 108, thus, occupying limited to negligible space inside the cabin 108. In some embodiments, the system 200, 400 may include a combination of the laminate 202 (as described in FIGS. 2 and 3) and the laminate 410 (as described in FIG. 4) in order to provide a combination of passive sound attenuation and active noise cancellation. Also, the system 200, 400 may be retrofitted in any vehicle with little or no modification to the existing configuration, in turn, improving flexibility and compatibility.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

I claim:

1. A sound management system for a vehicle, the sound management system comprising:
   a vehicle window coupled to a vehicle body, wherein the vehicle body defines an interior space of the vehicle;
   an actively controlled laminate disposed on the vehicle window and configured to generate vibrations and transmit sound to reduce noise in the interior space of the vehicle; the laminate being actively controlled in combination with an exhaust active noise cancellation system; and
   a controller coupled to the laminate; the controller receiving a signal indicative of a noise level inside the vehicle;
   wherein the controller controls the laminate by:
      processing the received signal;
      detecting a desirable noise signal and an undesirable noise signal based on the received signal; and
      transmitting the undesired noise signal to a vehicle cabin after filtering.

2. The sound management system of claim 1, wherein the laminate is a passive film that reduces transmission of sound to the interior space of the vehicle.

3. The sound management system of claim 2, wherein the laminate is applied to the vehicle window through an adhesive.

4. A vehicle comprising:
   a vehicle body defining an interior space of the vehicle; and
   a sound management system for the vehicle, the sound management system including:
      a vehicle window coupled to the vehicle body; and
      an actively controlled laminate disposed on the vehicle window and configured to generate vibrations and transmit sound to reduce noise in the interior space of the vehicle; the laminate being actively controlled in combination with an exhaust active noise cancellation system; and
      a controller coupled to the laminate; the controller receiving a signal indicative of a noise level inside the vehicle;
      wherein the controller controls the laminate by:
         processing the received signal;
         detecting a desirable noise signal and an undesirable noise signal based on the received signal; and
         transmitting the undesired noise signal to a vehicle cabin after filtering.

5. The vehicle of claim 4, wherein the laminate is a passive film that reduces transmission of sound to the interior space of the vehicle.

6. The vehicle of claim 5, wherein the laminate is applied to the vehicle window through an adhesive.

7. The sound management system of claim 3, wherein the laminate is applied to an inner surface of the vehicle window.

8. The sound management system of claim 1, wherein the laminate comprises a base layer, an intermediate layer, and a cover layer.

9. The sound management system of claim 8, wherein the base layer is adapted to apply the laminate to the vehicle window.

10. The sound management system of claim 8, wherein the intermediate layer is adapted to attenuate sound being transmitted by the vehicle window.

11. The sound management system of claim 10, wherein the intermediate layer comprises one of a sound absorbing or sound reflecting material.

12. The sound management system of claim 8, wherein the cover layer is adapted to the intermediate layer to provide surface protection.

13. The vehicle of claim 6, wherein the laminate is applied to an inner surface of the vehicle window.

14. The vehicle of claim 4, wherein the laminate comprises a base layer, an intermediate layer, and a cover layer.

15. The vehicle of claim 14, wherein the base layer is adapted to apply the laminate to the vehicle window.

16. The vehicle of claim 14, wherein the intermediate layer is adapted to attenuate sound being transmitted by the vehicle window.

17. The vehicle of claim 15, wherein the intermediate layer comprises one of a sound absorbing or sound reflecting material.

18. The vehicle of claim 14, wherein the cover layer is adapted to the intermediate layer to provide surface protection.

* * * * *